(12) United States Patent
Zelenkov

(10) Patent No.: US 7,348,896 B2
(45) Date of Patent: Mar. 25, 2008

(54) AIRCRAFT SECURITY METHOD

(76) Inventor: Sergei E. Zelenkov, 3200 Harrison Springs Rd. NW., Corydon, IN (US) 47112

( * ) Notice: Subject to any disclaimer, the term of this patent is extended or adjusted under 35 U.S.C. 154(b) by 201 days.

(21) Appl. No.: 11/242,561

(22) Filed: Oct. 3, 2005

(65) Prior Publication Data

US 2007/0075876 A1    Apr. 5, 2007

(51) Int. Cl.
*G08B 23/00* (2006.01)
(52) U.S. Cl. .................. 340/963; 340/945; 340/426.12
(58) Field of Classification Search ................ 340/963, 340/945, 966, 500, 517, 425.5, 426.1, 426.12; 359/265, 275, 241
See application file for complete search history.

(56) References Cited

U.S. PATENT DOCUMENTS

| 4,326,189 | A | 4/1982 | Crane |
| 6,493,128 | B1 | 12/2002 | Agrawal et al. |
| 6,731,203 | B2 * | 5/2004 | Cote, Jr. .................. 340/426.1 |
| 6,882,288 | B2 * | 4/2005 | Weigl .......................... 340/945 |
| 7,193,520 | B2 * | 3/2007 | Shear ......................... 340/574 |

* cited by examiner

*Primary Examiner*—Toan N. Pham
(74) *Attorney, Agent, or Firm*—Robert J. Harter

(57) ABSTRACT

A security method obscures the visibility through an aircraft's windshield upon determining the existence of a potential security problem, such as a terrorist attempting to take unauthorized control of the aircraft. The windshield can be obscured by various means such as actuating a liquid crystal system of a chromogenic glass pane; automatically drawing a shade or curtain in front of, behind, or within the windshield; and applying to or within a windshield an opaque or translucent fluid. Although an obscured windshield would likely impede the terrorist, it would not create a problem for a skilled pilot that is more familiar with the aircraft and its instruments. Determining whether a potential security problem exists can be accomplished in various ways such as scanning ID cards; reading passwords; communicating with the flight crew; actuating emergency buttons aboard the aircraft; and comparing cell phone numbers, voice imprints, or facial images to a database.

5 Claims, 3 Drawing Sheets

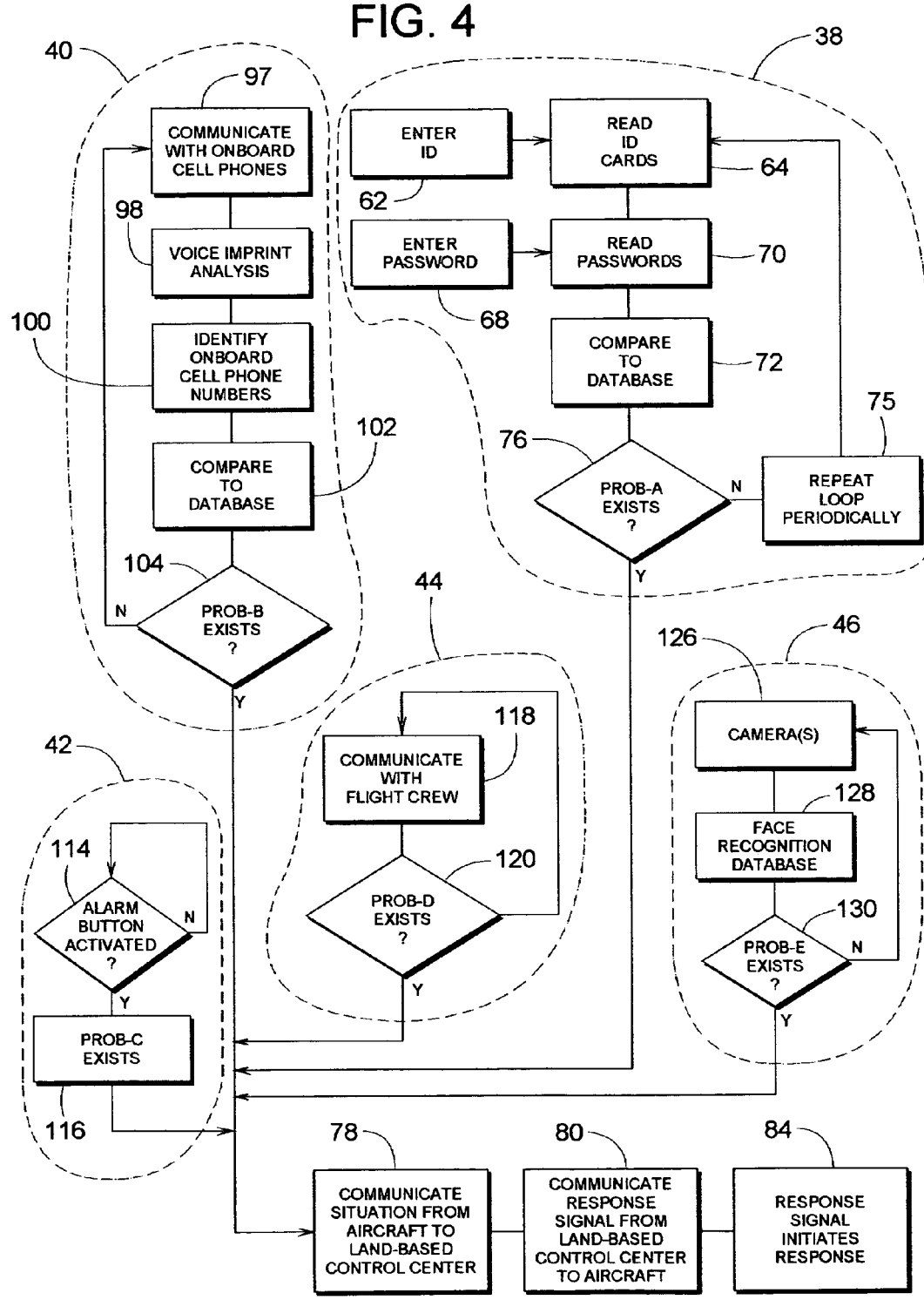

US 7,348,896 B2

AIRCRAFT SECURITY METHOD

BACKGROUND OF THE INVENTION

1. Field of the Invention

The subject invention generally pertains to aircraft security and more specifically to a method for thwarting terrorism on an aircraft.

2. Description of Related Art

Terrorists have been known to forcibly take over commercial aircrafts. Although the flight crew and certain other members onboard, such as Field Air Marshals and Federal Flight Deck Officers, may be armed or have other means of defense, terrorist might still overpower them and eventually take control of the aircraft to do whatever they choose. In some cases, for instance, terrorists may use the aircraft as a missile and direct it toward a heavily populated area, nuclear power plant, or other targets Consequently, a need still exists for a better method of effectively dealing with aircraft-related terrorism.

SUMMARY OF THE INVENTION

To provide a better method of resisting terrorism on an aircraft, it is an objection of some embodiments of the invention to reduce or completely block the visibility of a cockpit windshield upon determining that a security problem exists, whereby a terrorist taking control of the aircraft would need to rely on an automatic pilot or other means for controlling the flight of the plane.

Another object of some embodiments is to use a land-based or other remote controller to control the visibility of an aircraft's windshield.

Another object of some embodiments is to provide a method of maintaining clear and complete communication between those aboard the afflicted aircraft and others on the ground or in other aircraft.

Another object of some embodiments is to determine the potential for a security problem based on a plurality of ID entries and/or passwords entered into a control system.

Another object of some embodiments is to determine the potential for a security problem based on a plurality of ID entries or passwords being repeatedly entered over the duration of a single flight.

Another object of some embodiments is to determine the potential for a security problem based on a signal from either an aircraft-mounted emergency button or a portable person-carried emergency button.

Another object of some embodiments is to use a liquid crystal system as a defense against terrorists attempting to take control of an aircraft.

Another object of some embodiments is to determine the potential for a security problem by automatically determining a plurality of phone numbers aboard the aircraft and comparing those to database.

Another object of some embodiments is provide an aircraft with a telephone communication system that not only provides a communication link between an onboard phone and another phone but also helps determine the phone number of at least one of the two phones.

One or more of these and/or other objects of the invention are provided by a security method that determines the potential of security problem based on cell phones aboard the aircraft or based on some other criteria. In response to determining a potential security problem exists, in some cases the security method partially or completely obscures the visibility of the aircraft's windshield.

BRIEF DESCRIPTION OF THE DRAWING

FIG. 4 is a block diagram illustrating the various steps of an aircraft security method.

DESCRIPTION OF THE PREFERRED EMBODIMENT

Figure 1:
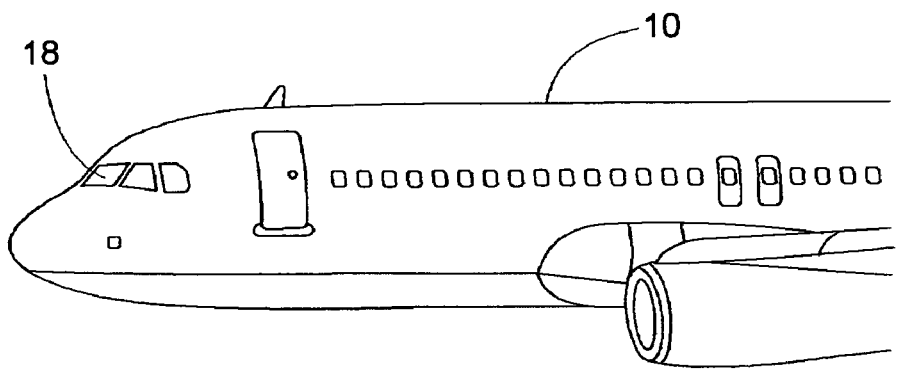
FIG. 1 is a side view of an aircraft with its windshield clear.
Figure 2:
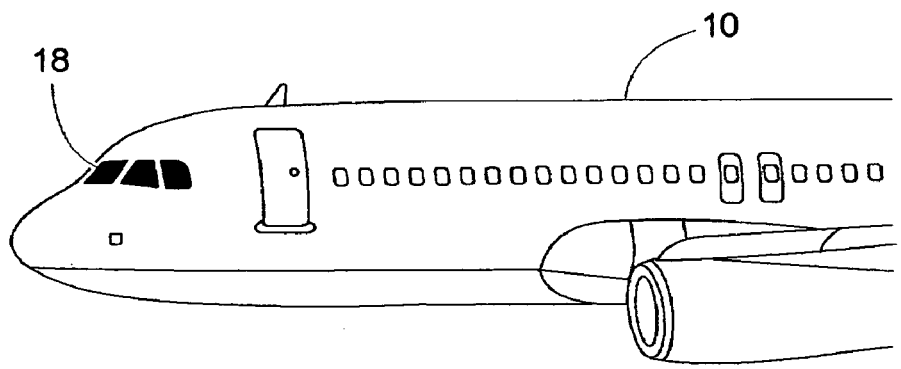
FIG. 2 is a side view of the aircraft of FIG. 1 but showing the windshield obscured by way of an aircraft security method.
Figure 3:
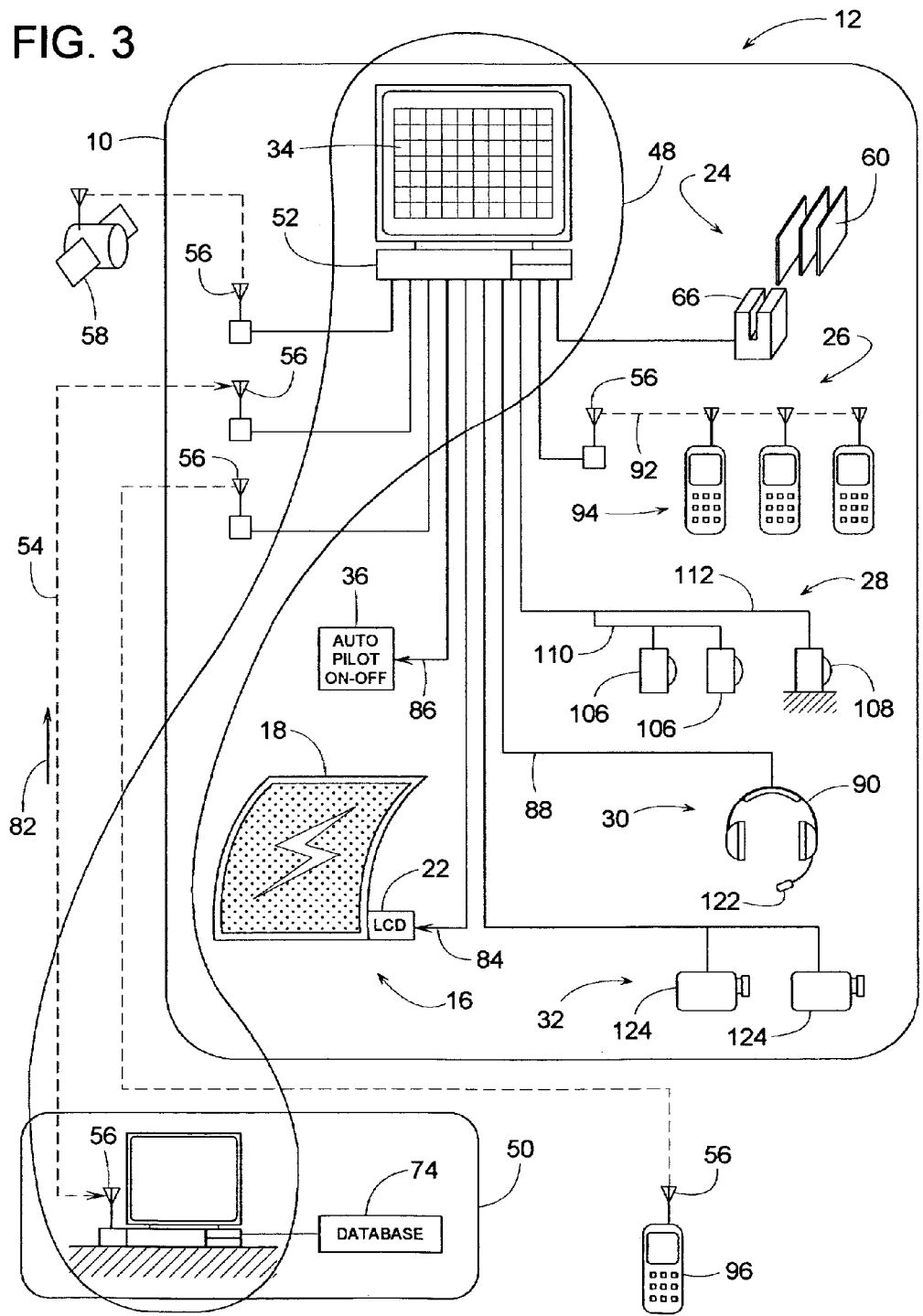
FIG. 3 is a schematic diagram showing one embodiment of an aircraft security system.

Referring to FIGS. 1-4, to prevent others from taking unauthorized control of an aircraft 10, an aircraft security system 12 of FIG. 3 can be used according to a security method 14 of FIG. 4. Although there can be many aspects of system 12 and method 14, in some cases, for example, when a terrorist attempts to take control of aircraft 10, a window-obscuring feature 16 of system 12 simply obscures or completely blocks the visibility through a cockpit windshield 18 of the aircraft. Blocking the windshield would greatly limit the ability of terrorists or other semiskilled pilots to effectively control the aircraft; however, obscuring the windshield's visibility would create little if any problem for qualified pilots that are more familiar with the aircraft, provided, of course, aircraft 10 can be controlled by instruments or conventional automatic pilot.

Any appropriate method for obscuring the view through windshield 18 could be used. In a currently preferred embodiment, windshield 18 can be partially or completely obscured by an electrically controlled liquid crystal system 22 similar to those commonly used for liquid crystal displays or chromogenic windows. Other possible methods for blocking the view through windshield 18 include, but are not limited to, automatically drawing a shade or curtain in front of, behind, or within the windshield (double-pane window); applying to or within a double-pane windshield an opaque or translucent fluid (e.g., gas, liquid or smoke); employing lights in such a manner so as to reduce visibility. More detailed descriptions of methods for reducing the visibility through a windshield can be found in U.S. Pat. No. 6,493,128, which is specifically incorporated by reference herein.

Window-obscuring feature 16 of system 12 and method 14 may be more effective if used in combination with one or more additional security features. Some examples of such additional features include, but are not limited to, an ID/password system 24, an onboard phone discriminator 26, fixed and portable emergency buttons 28, an internal communication system 30 (e.g., ICS with headsets), a camera system 32, a user input 34 (e.g., yes/no toggle switch or touch screen), and an autopilot controller 36. The method of using these features is illustrated in the algorithm or flowchart of FIG. 4, which includes a first subroutine 38 pertaining to ID/password system 24, a second subroutine 40 pertaining to phone discriminator 26, a third subroutine 42 pertaining to emergency buttons 28, a fourth subroutine 44 pertaining to communication system 30, and a fifth subroutine 46 pertaining to camera system 32.

In some cases, one or more of the security features 16, 24, 26, 28, 30 and 32 can share a common control system 48 for performing the steps of FIG. 4. In a currently preferred embodiment, control system 48 includes a land-based control center 50 plus an onboard controller 52 carried by aircraft 10. Land-based control center 50 and onboard controller 52 are schematically illustrated to represent any electronic system for storing data, manipulating data, receiving electrical input signals, providing electrical output signals, and performing logical operations such as those shown in FIG. 4. A computer is just one of many possible examples of either onboard controller 52 or land-based control center 50.

A wireless communication link 54 can place the land-based control center 50 and onboard controller 52 in communication with each other. Such a communication link could be similar to that used for ACARS, which is a registered trademark of ARINC Incorporated. Although some say ACARS stands for "ARINC Communications Addressing and Reporting System," others understand it as being an acronym for "Aircraft Communications Addressing and Reporting System." Communication link 54 and additional communication links associated with control system 48 can be made possible by various antennas 56 and perhaps even a satellite 58. ACARS and communication via satellite and/or antennas are well known by those of ordinary skill in the art.

Although the actual implementation of security method 14 may vary depending on the situation on the aircraft and the actual security features being used, the algorithm of FIG. 4 provides several examples of how method 14 can be performed.

Referring first to subroutine 38, security method 14 can determine a potential security problem exists based on whether the chosen members of the flight crew and certain other members onboard (e.g., Field Air Marshals, Federal Flight Deck Officers, etc.) are in fact aboard aircraft 10. This can be accomplished using ID cards 60 and/or passwords. Blocks 62 and 64 of subroutine 38 represent the step of inputting a plurality of ID entries into control system 48 via an ID card reader 66 (e.g., card sensor, scanner, etc.). Blocks 68 and 70 represent the step of inputting passwords of the flight crew and other members onboard. The passwords can be entered using a conventional keyboard associated with onboard controller 52. In block 72, the ID entries and passwords are compared to a database 74 stored on land-based control center 50, onboard controller 52, or elsewhere. Database 74 helps determine whether a problem-A exists, such as the plurality of ID entries having an unexpected ID entry (e.g., an unauthorized ID) or missing an expected ID entry (e.g., the flight captain's ID). A block 75 represents the step of repeatedly inputting the plurality of ID entries over a predetermined duration (e.g., once every hour, 600 miles, or some other predetermined duration) of a single flight of the aircraft. With block 75, an ID or password may only be valid for one leg or just a portion of the aircraft's entire journey. If problem-A exists, a logic block 76 directs the control to block 78.

Block 78 represents the step of communicating the problem situation from onboard controller 52 to land-based control center 50. This can be done via communication line 54. Next, a block 80 represents providing a response-signal 82 and communicating that signal from land-based control center 50 to onboard controller 52, which can be done while aircraft 10 is in flight. Block 84 represents onboard controller 52 directing an appropriate response to the response signal. In some cases, for instance, the appropriate response may be substantially obscuring the visibility through windshield 18, which can be done by controller 52 providing an output signal 84 to circuit 22 or mechanism that affects the windshield's visibility. Alternatives or additions to obscuring windshield 18 may include activating or de-activating the autopilot via a signal 86; exchanging verbal information with the flight crew via a communication line 88 and a headset 90; exchanging verbal information with one or more of the passengers via a communication link 92, antenna 56, and portable phones 94; and increasing the visibility through windshield 18.

Referring to second subroutine 40, security method 14 can determine a potential security problem exists based on the phone numbers of the portable phones 94 aboard aircraft 10 or based on an analysis of the voices heard over the phones. In some embodiments of the invention, onboard controller 52 serves as a communication link between the plurality of phones 94 and an already existing cellular communication network that might serve another remote phone 96. In block 97 of subroutine 40, communication can thus occur between onboard controller 52 and at least one of phones 94. In block 98, a voice coming from one of phones 94 and conveyed to onboard controller 52 can be analyzed upon comparing the voice to a database of previously stored voice imprints. Referring to a block 100, upon controller 52 relaying calls from one or more of phones 94, controller 52 can identify the calling phone numbers (i.e., determining a plurality of phone numbers) and compare those numbers to a database associated with or accessible by control system 48. In block 102, if one or more of the identified phone numbers includes a suspicious phone number (e.g., one that matches one stored on the database or one that does not match a passenger manifest), or if the voice from one of phones 94 matches a voice imprint stored on the database, then a block 104 may determine that a potential security problem-B exists, and decision block 104 transfers control to blocks 78, 80 and 84, whose functions have already been explained.

Referring to third subroutine 42, security method 14 can determine a potential security problem exists if one or more of the emergency buttons 106 or 108 are actuated. Buttons 106 are person-carried emergency buttons that can be carried or worn by members of the flight crew and certain other members aboard aircraft 10. Button 108 is an aircraft-mounted emergency button that can be installed at a substantially fixed location on aircraft 10. Aircraft 10 may have one or several aircraft-mounted buttons. A first communication link 110 places buttons 106 in communication with onboard controller 52, and a second communication link 112 places button 108 in communication with controller 52. Logic blocks 114 and 116 represent the step of determining the potential security problem exists based on at least one of the aircraft-mounted emergency button 108 and the person-carried emergency buttons 106 being actuated. If one has been actuated, control transfers to control blocks 78, 80 and 84, whose functions have already been explained.

Referring to blocks 118 and 120 of fourth subroutine 44, security method 14 can determine a potential security problem exists by communicating between someone aboard aircraft 10 and someone at land-based control center 50. The pilot, for example, may use headset 90 with microphone 122 to tell someone at land-based control center 50 that aircraft 10 is being hijacked. If such a problem occurred, blocks 78, 80 and 84 could address the problem accordingly.

Referring to subroutine 46, cameras 124 can also be used to identify a potential security problem. Block 126 represents using one or more stationary or moving cameras 124 on aircraft 10 to capture facial images of those onboard. A block 128 represents comparing the captured facial images to a database of previously stored facial images. Decision block 130 determines whether a potential problem exists based on whether any of the facial images of those onboard match any of the images stored on the database. If such a problem exists, blocks 78, 80 and 84 could address the problem accordingly.

It should be noted that database 74 could store any or all of the data mentioned in reference to any of the subroutines of the algorithm or method 14. Also, the various subroutines 38, 40, 42, 44 and 46 could be run repeatedly, continually, periodically, simultaneously, sequentially, or various combinations thereof The expression, "potential security problem," refers to a situation where there is evidence of an increased likelihood of an unauthorized person appreciably disrupting a predetermined flight plan of an aircraft. Several examples of potential security problems have been given; however, potential security problems are not limited to just those that have been specifically mentioned herein.

Although the invention is described with reference to a preferred embodiment, it should be appreciated by those of ordinary skill in the art that various modifications are well within the scope of the invention Therefore, the scope of the invention is to be determined by reference to the following claims.

The invention claimed is:

1. A security method for responding to a potential security problem that relates to an aircraft that includes a cockpit windshield and is associated with a control system, the security method comprising:

determining that the potential security problem exists;

in response to determining that the potential security problem exists, reducing the visibility through the cockpit windshield; and communicating an obscure-window signal from a land-based control center to the aircraft while the aircraft is airborne, wherein the step of reducing the visibility through the cockpit windshield is in further response to the obscure-window signal.

2. A security method for responding to a potential security problem that relates to an aircraft that includes a cockpit windshield and is associated with a control system, the security method comprising:

determining that the potential security problem exists;

in response to determining that the potential security problem exists, reducing the visibility through the cockpit windshield; and inputting a plurality of ID entries into the control system, wherein the step of determining the potential problem exists is based on the plurality of ID entries having at least one of an unexpected ID entry and a missing ID entry.

3. The security method of claim 2, wherein the step of inputting a plurality of ID entries involves sensing an ID card plus entering a password into the control system.

4. The security method of claim 2, further comprising repeatedly inputting the plurality of ID entries over a duration of a single flight of the aircraft.

5. A security method for responding to a potential security problem that relates to an aircraft that includes a cockpit windshield and is associated with a control system that controls the visibility through the cockpit windshield, the security method comprising:

determining that the potential security problem exists;

in response to determining that the potential security problem exists, reducing the visibility through the cockpit windshield;

providing a first communication link between the control system and an aircraft-mounted emergency button that is installed at a substantially fixed location relative to the aircraft; and providing a second communication link between the control system and a person-carried emergency button, wherein the step of determining the potential security problem exists is based on at least one of the aircraft-mounted emergency button and the person-carried emergency button being actuated.

* * * * *